Oct. 8, 1929.   W. L. ADAMS   1,731,208
FISHING REEL AND HANDLE DRAG
Filed Jan. 17, 1927   2 Sheets-Sheet 1
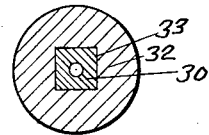
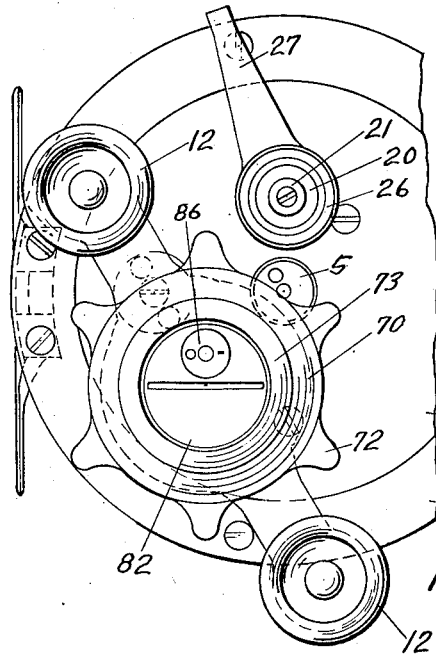
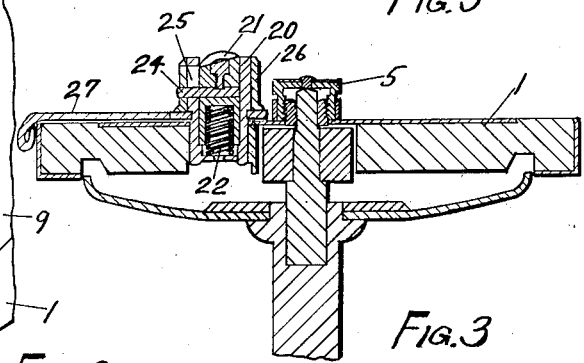
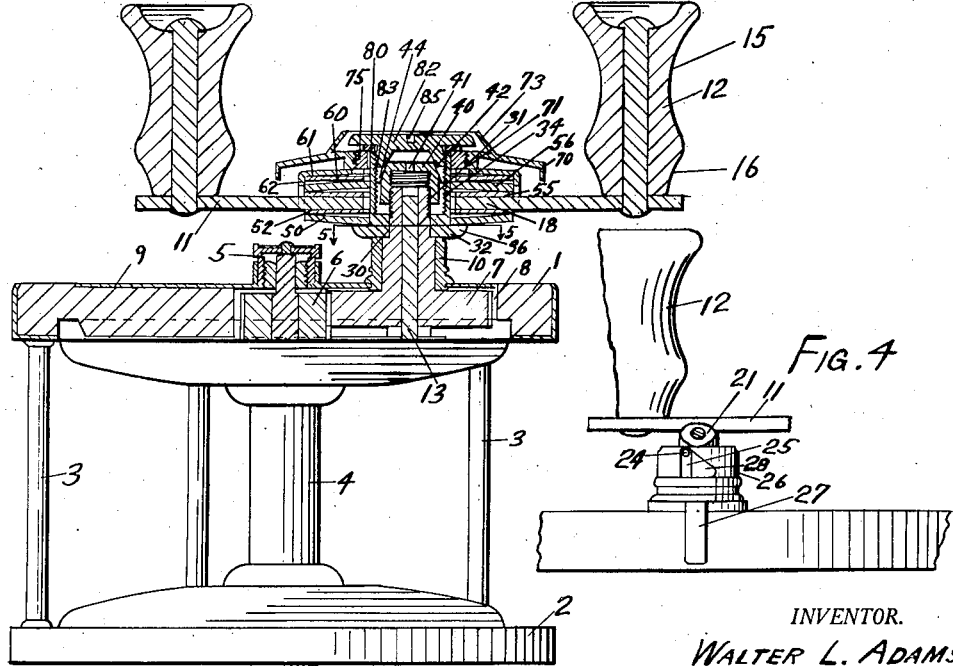
INVENTOR.
WALTER L. ADAMS
BY
Ely + Barrow
ATTORNEYS.

Oct. 8, 1929.     W. L. ADAMS     1,731,208
FISHING REEL AND HANDLE DRAG
Filed Jan. 17, 1927      2 Sheets-Sheet 2

INVENTOR.
WALTER L. ADAMS
BY
Ely T Barrow
ATTORNEYS.

Patented Oct. 8, 1929

1,731,208

UNITED STATES PATENT OFFICE

WALTER L. ADAMS, OF AKRON, OHIO, ASSIGNOR TO THE ENTERPRISE MANUFACTURING COMPANY, OF AKRON, OHIO, A CORPORATION OF OHIO

FISHING REEL AND HANDLE DRAG

Application filed January 17, 1927. Serial No. 161,491.

This invention relates to fishing reels and particularly to reels of the type which is provided with a friction drag mechanism operative when desired by the fisherman, to exert frictional drag upon the rotation of the spool when it is being unreeled by the running of a fish. Reels of this general type are old and well known, and it is the object of the invention to improve certain features of construction of the handle drag so as to obtain new and useful results in a new and improved manner.

One of the objects of the invention is to improve upon reels of this type so that the degree of friction or drag exerted through the handle may be adjusted during the rotation of the spool. In certain forms of handle drags the adjusting device has heretofore rotated with the spool so that it was impossible for the fisherman to vary the degree of frictional drag during the running of the fish. In the new and improved form shown, the adjusting device is non-rotative with the spool so that any desired variation may be made while the reel is in operation.

It is also an object of the invention to so construct the reel that rotation of the adjusting device will not disassemble the friction assembly. A further object of the invention is to devise a friction drag mechanism which will embody a maximum number of friction elements and thereby make the device capable of exerting maximum drag upon the reel and in which the friction disks will outwear friction disks of previous designs. It is also possible to secure a more accurate adjustment of the frictional drag with the improved handle drag, than with former designs. It is also an object of the invention to construct a drag handle which will not foul or catch the line.

Other objects and advantages will be apparent from a detailed study and understanding of the construction illustrated and described herein, it being understood that while the invention has been described in considerable detail, it is not necessarily limited to such details but is capable of variations and modifications within the scope of the invention as set forth in the claims appended hereto.

In the drawings in which the preferred form of the invention is shown, the several views are as follows:

Figure 1 is a side elevation of a complete reel equipped with the new and improved handle drag, the crank and a portion of the reel being shown in section;

Figure 2 is a partial plan view of the reel;

Figure 3 is a detailed section of the stop;

Figure 4 is a fragmentary side view thereof;

Figure 5 is a section on the line 5—5 of Figure 1; and

Figure 6:
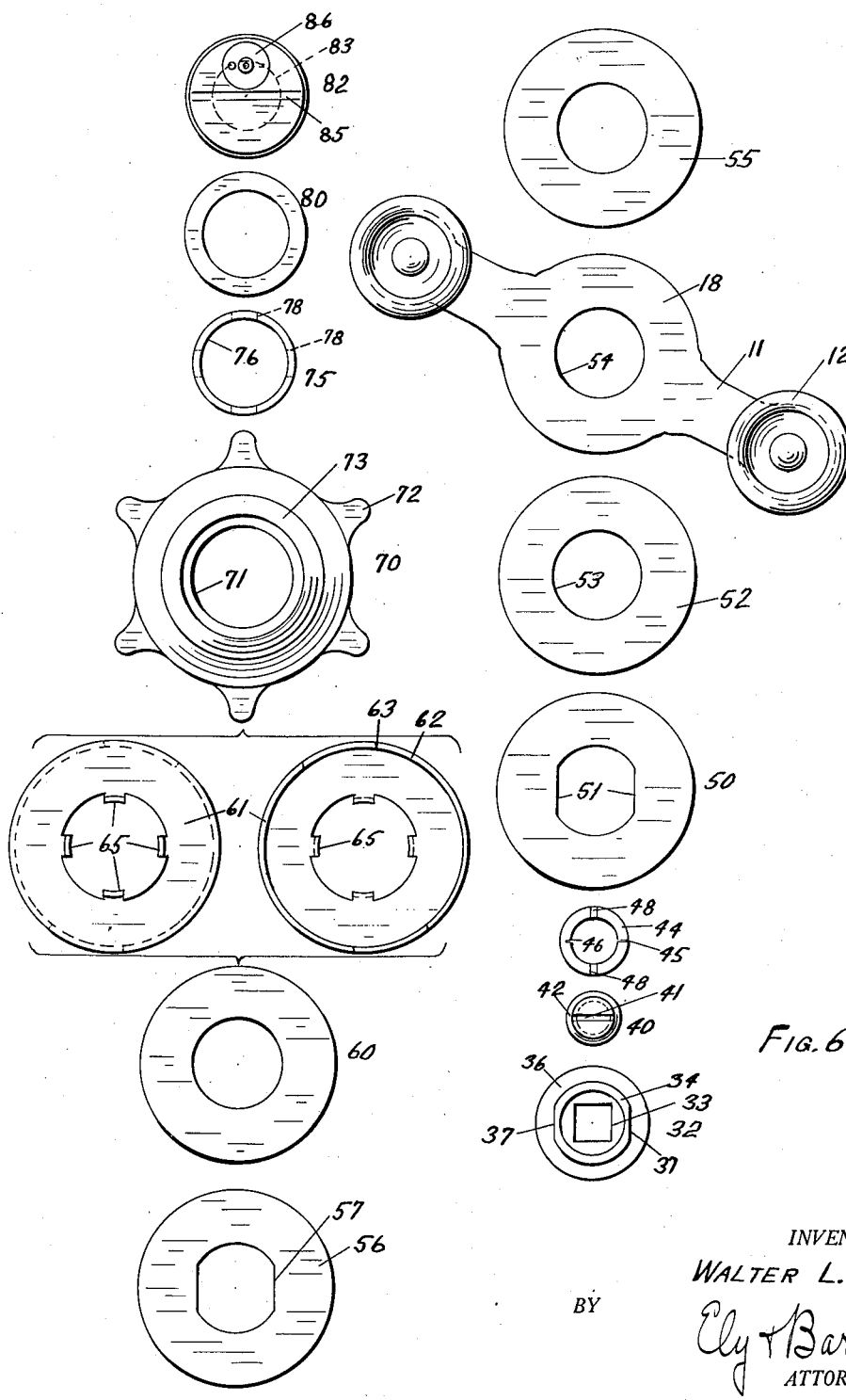
Figure 6 is a composite view of the several portions of the handle, disassembled and arranged in parallel columns in the order in which they are located in the complete handle drag assembly, the fifth item of the assembly being shown in obverse and reverse positions.

The reel comprises the usual front plate 1 and back plate 2 spaced apart by pillars 3 to form a support for the spool 4. The spool is supported in bearings 5 on the front and rear plates and is driven by a pinion 6 which meshes with a driving gear 7, the gears being housed in a recess 8 in the front plate which is enclosed by a cover 9.

The gear 7 is received in a bearing 10 projecting from the cover and is arranged to be driven by the crank indicated at 11, through the drag mechanism to be described. The crank has an enlarged centrally located portion 18 and is provided with two handles 12 mounted on the two extremities of the crank. The gear 7 rotates upon a shaft 13 projecting from the front plate, this bearing being exposed for oiling purposes. Each crank is formed with gripping portion 15 which is elevated above the friction mechanism by a spacer portion 16, so that there is no danger of fingers of operator being pinched between the crank and the friction mechanism.

On the front plate of the reel is arranged a stop mechanism which is adapted to be projected outwardly into the path of the crank so as to arrest its rotation whereby the spool will rotate through the frictional coupling between the crank and the gear 7. When the spool is to be operated without the drag the stop is withdrawn.

The stop mechanism may be of any preferred form, that shown in the drawings comprising a barrel or housing 20 in which is slidably mounted a plunger 21, the upper surface of which is inclined as shown. The plunger is urged upwardly by a coil spring 22 located within the barrel. A pin 24 is secured in the plunger and projects outwardly through a vertical slot 25 in the barrel whereby the plunger is prevented from rotating and the vertical movement of the plunger is controlled. A rotatable sleeve 26 surrounds the barrel to which sleeve is attached an operating lever 27 which projects over the edge of the front plate as shown. The sleeve 26 is formed with a substantially triangular shaped opening 28 through which the pin 24 extends. As shown in Figure 4, in the rotation of the sleeve, the cam surface of the opening 28 will determine the position of the plunger. The rear or vertical face of the plunger is adapted to intercept the crank in its rotation, the plunger being located so that the crank will be arrested during the unwinding of the line from the spool. The spring 22 will permit the plunger to be depressed upon movement in the opposite direction when winding up the line.

The hub of the driving gear 7 is reduced above the bearing 10 and provided with a squared shank 30 and with a further outwardly extended reduced and screw-threaded stem 31. Upon the shank of the gear is placed the carrier 32 of the handle drag mechanism, the central portion of which is provided with a squared socket 33 which fits over the shank 30 and makes a non-rotative connection therewith. The body of the carrier is preferably in the form of a sleeve being substantially cylindrical, formed with an inner screw-threaded stem 34 which extends upwardly through the main body of the handle drag and affords a support on which the various elements of the handle drag are positioned and centered. The part 32 is also formed with an outwardly extending flange 36 and with two parallel flattened areas 37 which extend upwardly along the stem.

The carrier is held in position upon the gear shank by means of a hollow nut 40 which is internally screw-threaded to engage the threaded stem 31. The outer surface of the nut is formed with a deep kerf 41 which communicates with the hollow interior of the nut so as to permit oil to pass into the interior of the nut onto the end of the bearing shaft 13. The upper surface of the nut is coned slightly as at 42 and over this coned surface is received the ring lock nut 44, the interior of which is coned to fit the end of the nut 40, and the exterior of which is threaded to engage the threads on the interior of the stem 34. The lock nut is split through at one point 45 and partially split at 46. The upper surface of the lock nut is provided with slots or kerfs 48 which are adapted to be engaged by a spanner wrench. It will be observed that upon tightening the lock nut, the coned formation of the nut 40 will cause the lock nut 44 to spread, gripping the threads on the interior of the stem thus constituting a secure locking device for holding the carrier sleeve in position.

Over the exterior of the carrier and resting upon the flange 36 is placed the dished washer 50 the convex face of which rests against the flange and the aperture of which is squared as at 51 to engage the flattened faces 37 on the carrier so as to form a non-rotative connection therewith. The dished washer exerts a spring action upon the friction disks which constitute the drag mechanism.

Over the washer 50 is placed the thin fiber friction disk 52 the opening 53 of which is round so as to freely revolve about the carrier and next to this disk is placed the crank 11, the rounded center 18 of which bears against the disk 52 and the center of which is provided with the round opening 54. A second friction disk 55 similar to the disk 52, is placed above the crank and above this is placed a second dished washer 56 having a flattened aperture 57 therein to form a nonrotative connection with the carrier sleeve. It will be observed that the washer 56 is faced in the opposite direction from the washer 50 so as to exert the maximum pressure upon the various friction disks.

Above the washer 56 is placed a third friction disk 60 and over the disks 60, 56 and 55 is located the flanged cap plate 61, the undersurface of which bears against the friction disk 60 and the flange 62 of which extends outside of the washers. The flange 62, being somewhat deeper than the combined thickness of the several disks above the handle and the enlarged portion 18 of the handle, is recessed at 63 so as to engage the extended arms of the crank 11. There is therefore, a non-rotative connection between the crank and the cap plate. The center of the cap is circular so as to permit rotation thereof about the carrier, and is provided with inwardly projecting wings or extensions 65 which project outwardly from the plane of the cap for a purpose to be described later.

Over the cap plate and bearing thereon is the adjusting plate or outer cap plate 70, the center of which is formed as an internally screw-threaded sleeve 71. The outer rim of the adjusting plate is formed with extensions or finger grips 72 and its upper or outer surface with a conical flanged guard rim 73.

Within the sleeve 71 and in threaded engagement therewith is a screw-threaded ring 75, the central aperture 76 of which is rotatable about the carrier and the undersurface of which is formed with notches 78 with which the projections 65 have a sliding fit or non-rotative engagement. A stop is provided for the ring. This may be done in any desirable manner, the preferred method being as described. The upper turns of the screw threads on the ring 75 are mutilated so that the ring cannot be screwed through the central aperture in the adusting plate, with the additional advantage that the ring is locked in position by rotation of the adjusting plate and the latter cannot be rotated far enough in the direction to release the pressure so that the handle drag will be disassembled accidentally. This also prevents faulty assembly of the drag handle.

Above the ring 75 is placed the final friction washer 80 and above the latter the top screw or cover 82 which is provided on its undersurface with a reduced screw-threaded extension 83, which engages the interior screw threads on the carrier. The cover 82 is located within the guard rim 73 and is protected thereby from engagement with the line. The upper surface of the cover is provided with a kerf 85 by which it may be rotated and also an oil admission port covered by a rotatable shutter 86 and through which oil may be admitted to the interior of the carrier sleeve and then through the slot 41 as has been described.

It will be observed that when the handle drag has been assembled the compression of the spring washers 50 and 56 and the consequent degree of friction exerted through the handle drag, may be adusted by rotation of the adjusting plate which, by its movement over the screw-threaded ring 75, bears with greater or less pressure upon the cap 61 and through the approach of this member toward the flange 36 compresses the friction disks 52 and 55 against the crank and the disk 60 against the interior surface of the cap. The upward movement of the ring is resisted by the overhanging flange of the cover 82. The disk 80 is compressed between the cover 82 and the upper surface of the ring 75. The non-rotative connection between the crank 11, the cap plate 61, and the ring 75 prevents rotation of the adjustment plate 70 with the spool and the former may be adjusted during the rotation of the spool to vary the extent of frictional resistance to rotation of the spool while the crank 11 is held by the plunger 21.

In recapitulating the device it will be noted that in operating the handle drag the parts 32, 40, 44, 50, 56, and 82 rotate with the spool. The parts 11, 61, 70 and 75 do not rotate. The several friction washers between these elements impart the frictional drag upon the rotation of the spool, the degree of which is determined by the position of the plate 70 on the ring 75.

It will thus be seen that the advantages which were set forth at the opening portion of the specification have been realized in an extremely efficient manner and it will be understood that modified forms of the invention may be substituted without departing from the scope of the invention as set forth in the claims.

What is claimed is:

1. In a fishing reel, a reel frame, a spool within the frame, gearing for driving the spool, a crank, an adjustable stop located within the path of the crank, and friction drag mechanism on the crank comprising, a carrier keyed to the gearing, the crank being rotatably mounted on the carrier, friction disks upon opposite sides of the crank, a cap over the friction disks, said cap having a non-rotative connection with the crank, a screw-threaded ring over the cap and in non-rotative connection therewith, an adjusting plate in screw-threaded engagement with the ring, and a cover upon the carrier and having a flange overhanging the ring.

2. A handle drag for attachment to a fishing reel comprising, a carrier adapted for non-rotative connection with the spool driving device, a crank rotatably mounted on the carrier, and a friction drag connection between the crank and the carrier comprising, a friction disk in contact with the surface of the crank, a cap over the disk and having telescoping connection with the crank, and means to compress the disk between the cap and the crank, said mechanism comprising, an adjusting disk and a member located in the same and in screw-threaded engagement therewith, and a cover over the disk and member and upon the carrier.

3. A fishing reel comprising a reel frame, a spool within the frame, gearing for driving the spool, a crank, an adjustable stop located within the path of the crank, and friction drag mechanism on the crank comprising, a cap over the crank and in telescoping engagement therewith, friction disks in contact with the crank, a cover, and a centrally located member and an adjusting plate in screw-threaded engagement therewith, the two last-named elements located between the cover and the cap.

4. A fishing reel comprising a reel frame, a spool within the frame, gearing for driving the spool, a crank, an adjustable stop located within the path of the crank, and friction drag mechanism on the crank comprising a cap over the crank and in telescoping engagement therewith, friction disks in contact with the handle, a cover, and a centrally located member telescoping with the cap and an adjusting plate in screw-threaded engagement therewith, the two last-named elements located between the cover and the cap.

5. A handle drag for fishing reels comprising, a gear post, a carrier secured thereto, a crank on the carrier and rotatable thereon, friction exerting members keyed to the carrier and exerting pressure on the crank, and means to vary the pressure upon the crank comprising, a cover on the carrier, and two members located between the cover and the crank and adapted to be adjusted to vary their combined thicknesses.

6. A handle drag for fishing reels comprising, a gear post, a carrier secured thereto, a crank on the carrier and rotatable thereon, friction exerting members keyed to the sleeve and exerting pressure on the crank, and means to vary the pressure upon the crank comprising, a cover on the carrier, and two members in screw-threaded engagement with one another, located between the cover and the crank and adapted to be adjusted to vary their combined thicknesses.

7. A handle drag for fishing reels comprising, a gear post, a carrier secured thereto, a crank on the carrier and rotatable thereon, friction exerting members keyed to the carrier and exerting pressure on the crank, and means to vary the pressure upon the crank comprising, a cover on the carrier, and two membes located between the cover and the crank and adapted to vary their combined thicknesses, one of said members having a non-rotative connection with the crank.

8. A handle drag for fishing reels comprising, a gear post, a carrier secured thereto, said carrier being provided with a sleeve, a crank over the carrier and rotatable thereon, friction exerting members keyed to the sleeve and exerting pressure on the crank, and means to vary the pressure upon the crank comprising, a cover on the carrier, and two members in screw-threaded engagement with one another, located between the cover and the crank and adapted to be adjusted to vary their combined thicknesses, one of said members having a non-rotative connection with the crank.

9. In a handle drag mechanism for fishing reels comprising, a carrier attachable to the spool driving mechanism, said carrier being provided with a sleeve, a crank on the carrier and rotatable thereon, a friction disk in contact with the crank, a cover on the sleeve extending over the friction disk, relatively adjustable members between the cover and the crank, adapted by their adjustment to vary the pressure upon the disk, and means to impart rotation from the crank through the friction disk to the spool driving mechanism.

10. In a handle drag mechanism for fishing reels comprising, a carrier attachable to the spool driving mechanism, said carrier being provided with a sleeve, a crank over the sleeve and rotatable thereon, a friction disk in contact with the crank and having driving connections with the spool driving mechanism, a cover on the carrier extending over the friction disk, and relatively adjustable members between the cover and the crank, adapted by their adjustment to vary the pressure upon the disk, one of said members having a non-rotative connection with the crank.

11. In a handle drag mechanism for fishing reels comprising, a carrier attachable to the spool driving mechanism, a crank on the carrier and rotatable thereon, a friction disk, a cover on the carrier, relatively adjustable members between the cover and the disk adapted by their adjustment to vary the pressure upon the disk, and means to impart rotation from the crank through the disk to the spool driving mechanism.

12. In a handle drag mechanism for fishing reels comprising a carrier attachable to the spool driving mechanism, a crank over the carrier and rotatable thereon, a friction disk, a cover on the carrier, a cap over the disk, relatively adjustable members between the cover and the cap adapted by their adjustment to vary the pressure upon the disk, the cap having telescoping engagement with the crank and with one of said adjustable members, and means to impart rotation from the crank through the disk to the spool driving mechanism.

13. A handle drag mechanism comprising a spool, a crank, a friction disk in contact therewith, and having driving connections with the spool, a cap over the disk, relatively adjustable members adapted to vary the pressure of the cap upon the disk, said members comprising a ring and an adjustable plate in screw-threaded engagement with one another, and means to prevent the separation of said members in one direction.

14. A handle drag mechanism comprising a spool, a crank, a friction disk in contact therewith and having driving connections with the spool, a cap over the disk, and relatively adjustable members adapted to vary the pressure of the cap upon the disk, said members comprising a ring and an adjustable plate in screw-threaded engagement with one another. the threads of one of said members being partially mutilated to prevent separation of the members in one direction.

15. A handle drag mechanism comprising a carrier having driving connections with the spool, a crank rotatable thereon, adjustable friction members upon the crank and having non-rotative connection with the carrier, a cover to retain said members together, an adjusting plate, and a rim upon the plate surrounding the cover.

16. A reel and a handle drag mechanism comprising, a screw-threaded stem upon the reel, a carrier sleeve over the stem having internal screw threads therein, and means to secure the sleeve upon the stem comprising, a nut in engagement with the stem, and a split lock nut in engagement with the interior of the sleeve, the said nuts being tapered whereby expansion of the lock nut is secured.

WALTER L. ADAMS.